United States Patent
Fujita et al.

(10) Patent No.: US 7,595,770 B2
(45) Date of Patent: Sep. 29, 2009

(54) SWITCH, IMAGE TRANSMISSION APPARATUS, IMAGE TRANSMISSION METHOD, IMAGE DISPLAY METHOD, IMAGE TRANSMITTING PROGRAM PRODUCT, AND IMAGE DISPLAYING PROGRAM PRODUCT

(75) Inventors: Kenichi Fujita, Shinagawa (JP); Katsuji Ideura, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 790 days.

(21) Appl. No.: 10/808,392

(22) Filed: Mar. 25, 2004

(65) Prior Publication Data

US 2004/0189598 A1    Sep. 30, 2004

(30) Foreign Application Priority Data

Mar. 26, 2003    (JP) ............................. 2003-084499

(51) Int. Cl.
    *G09G 5/00* (2006.01)
(52) U.S. Cl. .................. 345/1.1; 345/156; 345/157; 715/835; 715/856
(58) Field of Classification Search ............ 715/835, 715/856; 345/127, 157, 156
    See application file for complete search history.

(56) References Cited

U.S. PATENT DOCUMENTS

| | | | |
|---|---|---|---|
| 6,539,418 B2* | 3/2003 | Schneider et al. | 709/203 |
| 6,721,950 B1* | 4/2004 | Lupu | 719/310 |
| 2004/0042547 A1* | 3/2004 | Coleman | 375/240.01 |

FOREIGN PATENT DOCUMENTS

| | | |
|---|---|---|
| JP | 3-48922 | 3/1991 |
| JP | 9-69010 | 3/1997 |
| JP | 2001-344189 | 12/2001 |

* cited by examiner

*Primary Examiner*—Richard Hjerpe
*Assistant Examiner*—Leonid Shapiro
(74) *Attorney, Agent, or Firm*—Staas & Halsey LLP

(57) ABSTRACT

A switch selectively switches terminals to which a computer is connected, and that can be remotely operated by a remote-control computer connected to a predetermined network. This switch includes: an information acquiring unit that acquires cursor location information from the remote-control computer; an image extracting unit that extracts a cursor peripheral image from an image storing unit that stores an image obtained from the computer, based on the cursor location information acquired by the information acquiring unit; and a cursor image transmitting unit that transmits the cursor peripheral image, extracted by the image extracting unit, to the remote-control computer.

20 Claims, 14 Drawing Sheets

SWITCH, IMAGE TRANSMISSION APPARATUS, IMAGE TRANSMISSION METHOD, IMAGE DISPLAY METHOD, IMAGE TRANSMITTING PROGRAM PRODUCT, AND IMAGE DISPLAYING PROGRAM PRODUCT

BACKGROUND OF THE INVENTION

1. Field of the invention

The present invention relates to a switch, an image transmission apparatus, an image transmission method, an image display method, an image transmitting program, and an image displaying program.

2. Description of the Related Art

As the processing capacities of computers have dramatically increased, computers are being more and more widely used. It is not unusual today for an individual user to own more than one computer and use each computer in a different work environment. In such a case, the input/output devices such as a keyboard, a display, and a mouse, are connected to the computers through a switch, so as to save space and reduce costs.

The switch is generally called a KVM (Keyboard, Video, and Mouse) switch. The switch is provided between the input/output devices and the computers, and connects the input/output devices to only one of the computers. A user can operate the switch to select one of the computers to be connected to the input/output devices.

With the above conventional switch, however, it is necessary for a user to operate the mouse and keyboard connected to the switch, and therefore, the user has to stand by the mouse and keyboard at all times. So as to eliminate such an inconvenience, a switch that can be remotely operated has been developed.

With a remotely operated switch, it is possible for a user to access a computer connected to the switch not only from the mouse and keyboard connected to the switch, but also from a personal computer that is located in a remote place over a network. Japanese Unexamined Patent Publication No. 2001-344189 (hereinafter referred to as Patent Document 1) discloses an example of the conventional remotely operated switch. With the switch disclosed in Patent Document 1, a user can remotely switch computers from another computer equipped with an input device.

Japanese Unexamined Patent Publication No. 9-69010 (hereinafter referred to as Patent Document 2) discloses an image display technique relating to a switch. In a central monitor controlling system disclosed in Patent Document 2, a personal computer connected to the host computer over a network is used as a remote terminal, and image display information is transmitted to the display of a computer through an X-Window system. The remote terminal is operated with a mouse, and the host computer is notified of each screen switching operation through a keyboard. In this manner, the display of the computer can have the same screen display and functions as the monitor controlling display of the host computer.

Japanese Unexamined Patent Publication No. 3-48922 (hereinafter referred to as Patent Document 3) discloses a cursor controlling technique, though it does not relate to a switch. A pointing cursor predictive moving device disclosed in Patent Document 3 detects the history of movements of the mouse cursor, and predicts the final destination. The pointing cursor predictive moving device then moves the cursor directly to the icon located at the final destination, thereby shortening the cursor moving time.

With any conventional switch, however, the analog image output of each scanning line is converted into digital signals which are then transmitted to a remote-control computer connected to the network. Therefore, as the image to be transmitted widens, the time required for the A/D conversion increases, resulting in a decrease of the frame rate. The frame rate varies with the conversion processing speed. When the frame rate decreases, a pointing-type display involving a mouse cursor has a poorer pointing accuracy.

In some conventional switch, image data that are inputted from a selected computer are acquired at 1/n of the scanning frequency F ($1 \leq n < F$), and the acquired image is compared with the previously acquired image. As a result of the comparison, a line or a block including the different part is extracted, and the extracted line or block is transmitted to a remote-control computer. By this method, the entire image is checked for a difference, and therefore, the frame rate decreases as the image size increases. Also, when there is a great change in the image, the frame rate decreases. As the frame rate decreases, the mouse cursor display updating frequency drops, resulting in a poorer pointing accuracy.

With the pointing cursor predictive moving device disclosed in Patent Document 3, the cursor moving time can be shortened, but a decrease of the pointing accuracy due to a frame rate decrease cannot be prevented.

SUMMARY OF THE INVENTION

It is therefore an object of the present invention to provide a switch, an image transmission apparatus, an image transmission method, an image display method, an image transmitting program, and an image displaying program in which the above disadvantage is eliminated.

A more specific object of the present invention is to provide a switch, an image transmission apparatus, an image transmission method, an image display method, an image transmitting program, and an image displaying program that can maintain high pointing accuracy even when the image frame rate is low.

The above objects of the present invention are achieved by A switch that selectively switches from one terminal to another among a plurality of terminals to which a computer is connected, and that can be remotely operated by a remote-control computer connected to a predetermined network, the switch comprising: an information acquiring unit that acquires cursor location information from the remote-control computer; an image extracting unit that extracts a cursor peripheral image from an image storing unit that stores an image obtained from the computer, based on the cursor location information acquired by the information acquiring unit; and a cursor image transmitting unit that transmits the cursor peripheral image, extracted by the image extracting unit, to the remote-control computer.

The above objects of the present invention are also achieved by an image transmission apparatus that transmits an image to an information processing apparatus connected to a predetermined network, the image transmission apparatus comprising: an information acquiring unit that acquires cursor location information from the information processing apparatus; an image extracting unit that extracts a cursor peripheral image from an image storing unit that stores the image to be transmitted to the information processing apparatus, based on the cursor location information acquired by the information acquiring unit; and a cursor image transmitting unit that transmits the cursor peripheral image, extracted by the image extracting unit, to the information processing apparatus.

The above objects of the present invention are achieved by a method of transmitting an image to an information processing apparatus connected to a predetermined network, comprising the steps of: acquiring cursor location information from the information processing apparatus; extracting a cursor peripheral image from an image storing unit that stores the image to be transmitted to the information processing apparatus, based on the cursor location information acquired in the information acquiring step; and transmitting the cursor peripheral image, extracted in the image extracting step, to the information processing apparatus.

The above objects of the present invention are also achieved by a method of displaying an image transmitted from an information processing apparatus connected to a predetermined network, comprising the steps of: acquiring cursor location information; transmitting the cursor location information to the information processing apparatus; and combining a first image obtained from the information processing apparatus with a second image in accordance with the cursor location information acquired from the information processing apparatus that have received the cursor location information in the previous step.

The above objects of the present invention are also achieved by a computer readable image transmitting program product for operating a computer that transmits an image to an information processing apparatus connected to a predetermined network, the image transmitting program product causing the computer to function as: an information acquiring unit that acquires cursor location information from the information processing apparatus; an image extracting unit that extracts a cursor peripheral image from an image storing unit that stores the image to be transmitted to the information processing apparatus, based on the cursor location information acquired by the information acquiring unit; and a cursor image transmitting unit that transmits the cursor peripheral image, extracted by the image extracting unit, to the information processing apparatus.

The above objects of the present invention are also achieved a computer readable image displaying program product for operating a computer to display an image transmitted from an information processing apparatus connected to a predetermined network, the image displaying program product causing the computer to function as: an information acquiring unit that acquires cursor location information; an information transmitting unit that transmits the cursor location information, acquired by the information acquiring unit, to the information processing apparatus; and an image combining unit that combines a first image obtained from the information processing apparatus with a second image in accordance with the cursor location information transmitted from the information transmitting unit that have received the cursor location information from the information processing apparatus, the image combining unit then outputting a composite image to a display unit.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

Figure 1:
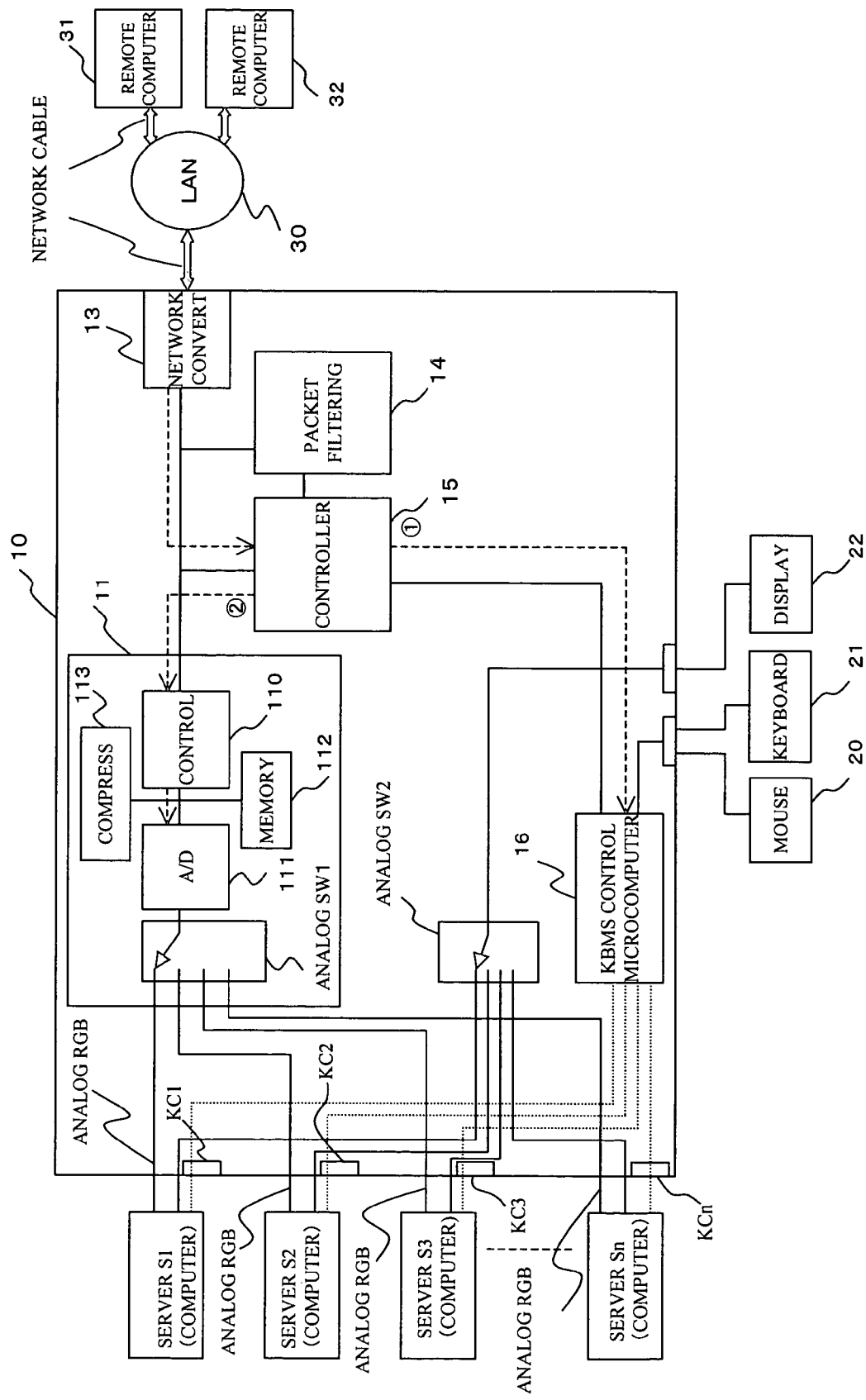
FIG. 1 is a block diagram illustrating a switch in accordance with the present invention.

FIG. 1 is a block diagram illustrating a switch 10 in accordance with the present invention. As shown in FIG. 1, servers S1 through Sn, a mouse 20 for operating the servers S through Sn in the vicinity, a keyboard 21, and a display 22, are connected to the switch 10.

Also, remote-control computers 31 and 32 that operate the servers S1 through Sn from remote areas are connected to the switch 10 over a network 30. In this embodiment, the network 30 is an Ethernet (a registered trademark) that is a bus-type LAN (Local Area Network).

The switch 10 includes an image processing unit 11, a network converting circuit 13, a packet filtering circuit 14, a controller 15, an analog switching unit SW2, a keyboard/mouse (KBMS) controlling microcomputer 16, and KBMS emulation controllers KC1 through KCn. The switch 10 corresponds to an information processing apparatus or an image transmission apparatus.

The image processing unit 11 performs predetermined operations for sending analog RGB signals from the servers S1 through Sn to the remote-control computers 31 and 32 over the network 30. The image processing unit 11 includes a controller 110, an A/D converting circuit 111, a memory 112, an image compressing circuit 113, and an analog switching unit SW1.

The analog switching unit SW1 switches access destinations of each of the remote-control computers 31 and 32 among the servers S1 through Sn. The analog switching unit SW1 performs this switching operation by controlling a switch (not shown) provided in the switch 10. The analog switching unit SW1 can be also controlled by the remote-control computers 31 and 32 to switch access destinations.

The controller 110 controls the entire image processing unit 11. The controller 110 functions as an information acquiring unit, an image extracting unit, and a cursor image transmitting unit, in accordance with a predetermined program. The information acquiring unit acquires cursor location information from the remote-control computers 31 and 32. Based on the cursor location information acquired by the information acquiring unit, the image extracting unit extracts a cursor peripheral image from the memory 112 (the image storing unit) that stores images obtained from the servers S1 through Sb (computers). The cursor image transmitting unit transmits the cursor peripheral image, extracted by the image extracting unit, to the remote-control computers 31 and 32.

When a cursor peripheral image is to be extracted, the controller 110 may detect an image change from a difference between a first image obtained from the servers S1 through Sn and a second image obtained after the first image. The controller 110 may then extract only a predetermined region including the changed part of the second image with respect to the first image.

The controller 110 also functions as an image transmitting unit that transmits general images to the remote-control computers 31 and 32 in accordance with a predetermined program. When acquiring cursor location information from the remote-control computers 31 and 32, the image transmitting unit stops transmitting a general image to the remote-control computers 31 and 32. After the cursor image transmitting unit transmits a cursor peripheral image, the image transmitting unit resumes transmitting a general image to the remote-control computers 31 and 32.

The controller 110 also issues an instruction to an image processing unit to perform image processing on general images to be transmitted to the remote-control computers 31 and 32 in accordance with a predetermined program. When acquiring cursor location information from the remote-control computers 31 and 32, the image processing unit stops performing image processing on a general image. After the cursor image transmitting unit transmits a cursor peripheral image, the image processing unit resumes performing image processing on the general image. The image processing includes A/D conversion to be performed by the A/D converting circuit 111, for example.

The controller 110 also detects an image change from a difference between a first image obtained from the servers S1 through Sn and a second image obtained after the first image, in accordance with a predetermined program. The controller 110 then transmits a predetermined region including the changed part of the second image with respect to the first image to the remote-control computers 31 and 32.

The image extracting unit may extract a cursor peripheral image at predetermined intervals. The predetermined intervals may be changed based on preset values issued from the remote-control computers 31 and 32. The predetermined values may also be changed in accordance with the congestion level of the network.

The A/D converting circuit 111 converts analog RGB signals transmitted from the servers S1 through Sn into digital signals to be transmitted over the network. The memory 112 stores image data transmitted from the server end. The memory 112 is equivalent to the image storing unit.

The image compressing circuit 113 compresses images to be transmitted to the remote-control computers 31 and 32 by a predetermined compression technique or at a predetermined compression ratio. The image compressing circuit 113 may change the compression technique or the compression ratio in accordance with the congestion level of the network 30. The image compressing circuit 113 is equivalent to the image compressing unit. Although the image compressing unit is embodied by hardware in the example shown in FIG. 1, it is also possible to be embodied by software. Where the image compressing unit is embodied by software, a predetermined program is loaded, and the controller 110 executes the predetermined program.

Under the control of the controller 15, the compression technique or the compression ratio may be arbitrarily changed in accordance with the congestion level of the network 30. Also, the remote-control computers 31 and 32 may perform a predetermined operation to change the compression technique or the compression ratio to be employed by the image compressing circuit 113. Examples of compression techniques include JPEG and MPEG.

Although the image processing unit 11 is a single unit in the example shown in FIG. 1, it is also possible to employ two or more image processing units 11. With two or more image processing units 11, the remote-control computers 31 and 32 can simultaneously access the servers S1 through Sn, for example. The image processing units 11 can be formed by boards, and the number of users who can access the servers S1 through Sn can be increased by increasing the number of boards.

The network converting circuit 13 connects the switch 10 to a LAN. The network converting circuit 13 converts digital signals transmitted from the image processing unit 11 and digital signals transmitted from the KBMS controlling microcomputer 16 into packets to be outputted over the network. The packet filtering circuit 14 adds up the amount of packet data received by the network converting circuit 13.

The controller 15 controls the entire switch 10. The controller 15 sends absolute coordinate values of the mouse received from the remote-control computers 31 and 32 to the image processing unit 11 as well as to the KBMS controlling microcomputer 16. The controller 15 controls the compression technique or the compression ratio to be employed by the image compressing circuit 113.

For each of the servers S1 through Sn, the KBMS controlling microcomputer 16 adjusts the mouse 20, the keyboard 21, and mouses and keyboards that are connected to the remote-control computers 31 and 32.

Figure 2:
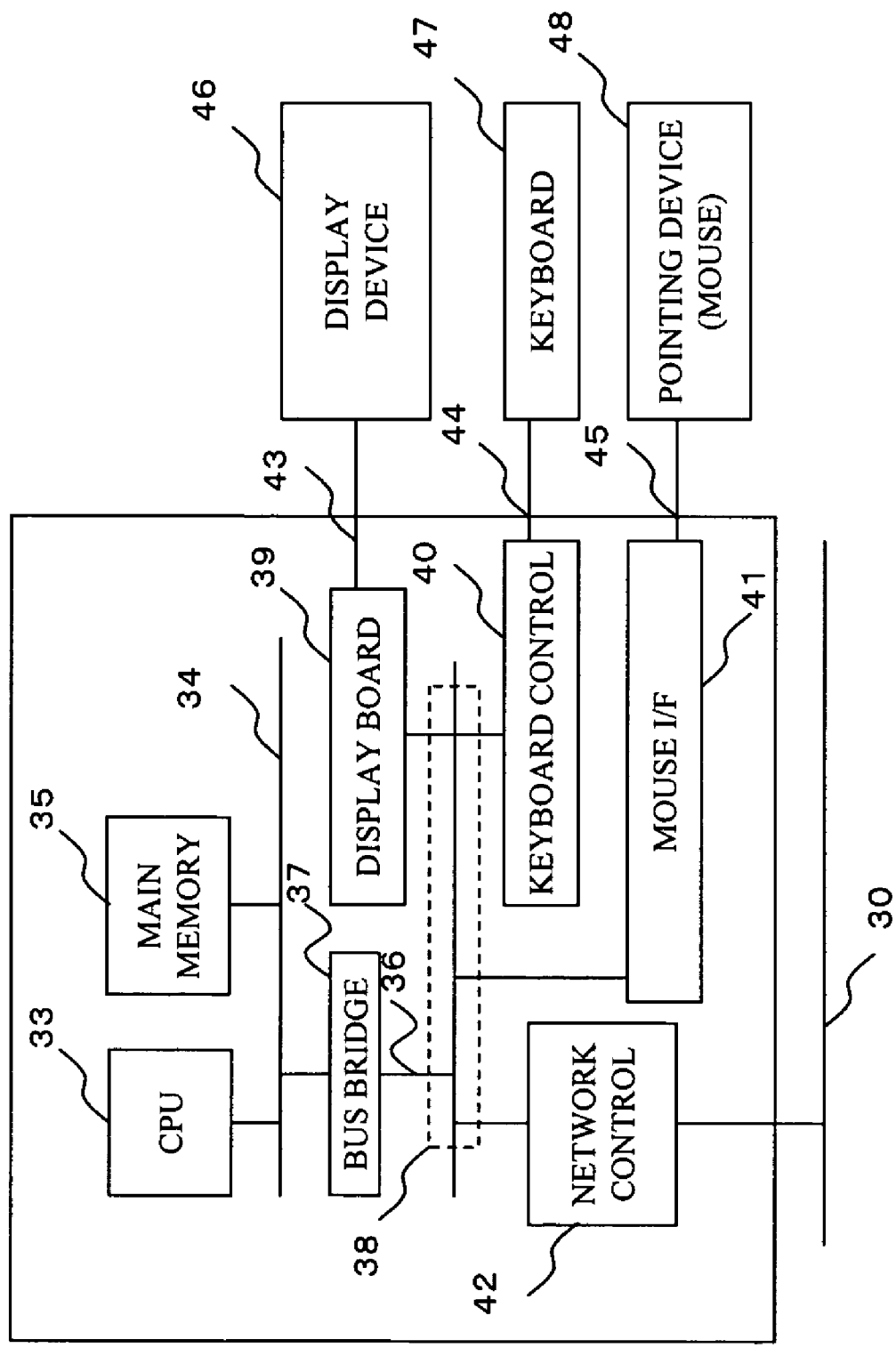
FIG. 2 is a block diagram illustrating the structure of a remote-control computer in accordance with the present invention.

The remote-control computers 31 and 32 will be next described. Each of the remote-control computers 31 and 32 is equivalent to an image processing apparatus. FIG. 2 is a block diagram illustrating the structure of the remote-control computer 32. As shown in FIG. 2, the remote-control computer 32 includes a central processing unit (CPU) 33, a CPU bus 34, a main memory unit 35, a system bus 36, a bus bridge 37, an expansion slot 38, a display board 39, a keyboard controller 40, a mouse interface 41, and a network controlling unit 42.

The CPU 33 is a processor that presides over control operations to be performed by the remote-control computer 32 functioning as an image processing apparatus. The CPU 33 is connected to the main memory unit 35 through the CPU bus 34. The bus bridge 37 connects the CPU bus 34 and the system bus 36. The expansion slot 38 connects various peripheral devices to the remote-control computer 32. The peripheral devices connected to the remote-control computer 32 in this example shown in FIG. 2 are the display board 39, the keyboard controller 40, the mouse interface 41, and the network controlling unit 42.

Figure 3:
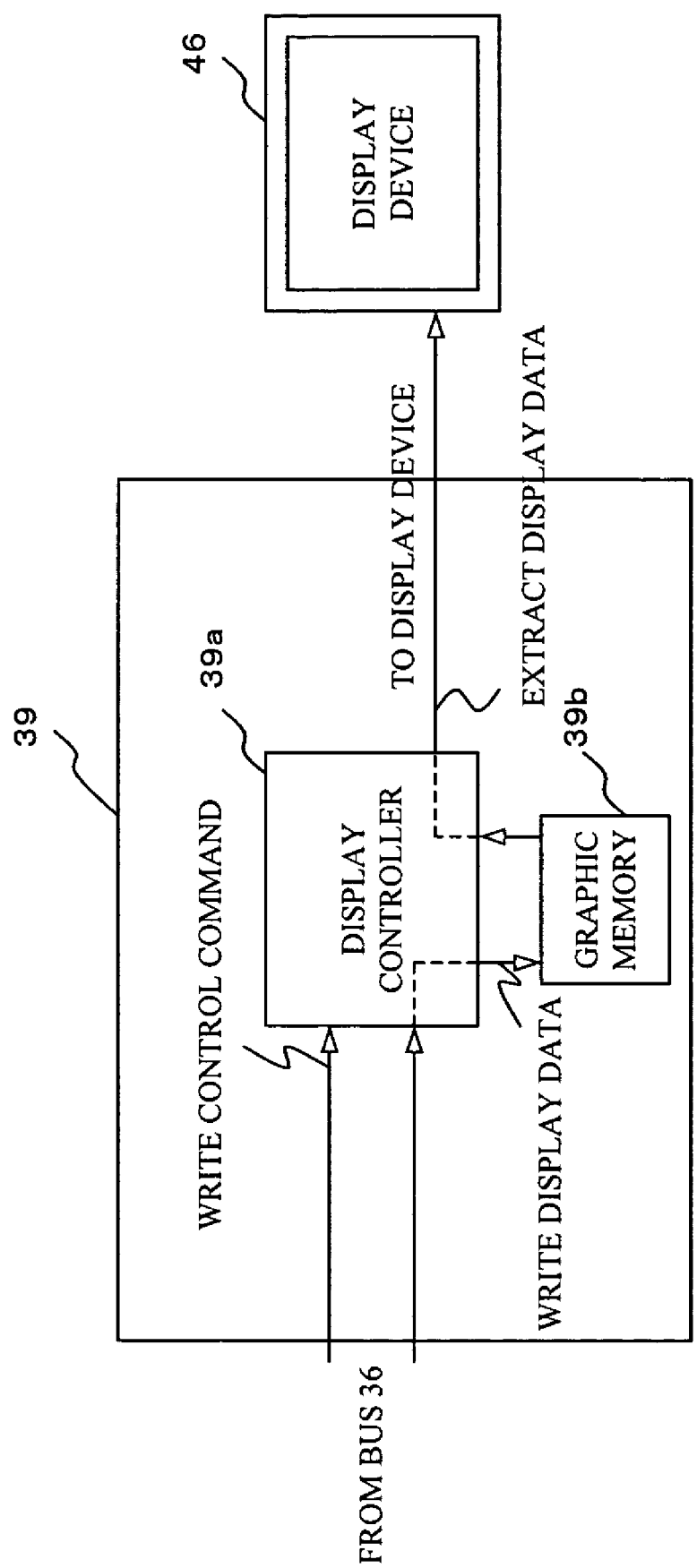
FIG. 3 illustrates the structure of a display board and a display device in accordance with the present invention.

Further, a display device 46, a keyboard 47, and a pointing device (a mouse) 48 are connected to the display board 39, the keyboard controller 40, and the mouse interface 41, respectively, through cables 43, 44, and 45. FIG. 3 illustrates the structure of the display board 39 and the display device 46 shown in FIG. 2. The display board 39 includes a display controller 39a and a graphic memory 39b.

The display controller 39a writes display data onto the graphic memory 39b and reads the display data out of the graphic memory 39b, in accordance with a command issued by the CPU 33 through the system bus 36. In this manner, the display controller 39a generates display data to be sent to the display device 46.

Between the remote-control computer 32 and the display device 46, a display operation is performed in the following manner. First, a control command from the CPU 33 is written onto the display controller 39a of the display board 39, via the CPU bus 34, the bus bridge 37, the system bus 36, and the expansion slot 38. The control command is also written onto the graphic memory 39b that is controlled by the display controller 39a.

The display controller 39a refers to the contents of the graphic memory 39b, and converts the contents into interface signals that can be displayed on the display device 46. The interface signals are transferred to the display device 46 through the cable 43, and are then displayed on the display device 46.

In accordance with a predetermined program, the CPU 33 issues an instruction to the display controller 39a to combine a first image obtained from the switch 10 (the information processing apparatus) with a second image obtained in accordance with cursor location information acquired by a first unit and transmitted from the switch 10 through a second unit. The display controller 39a outputs the composite image to the display device 46.

Figure 4:
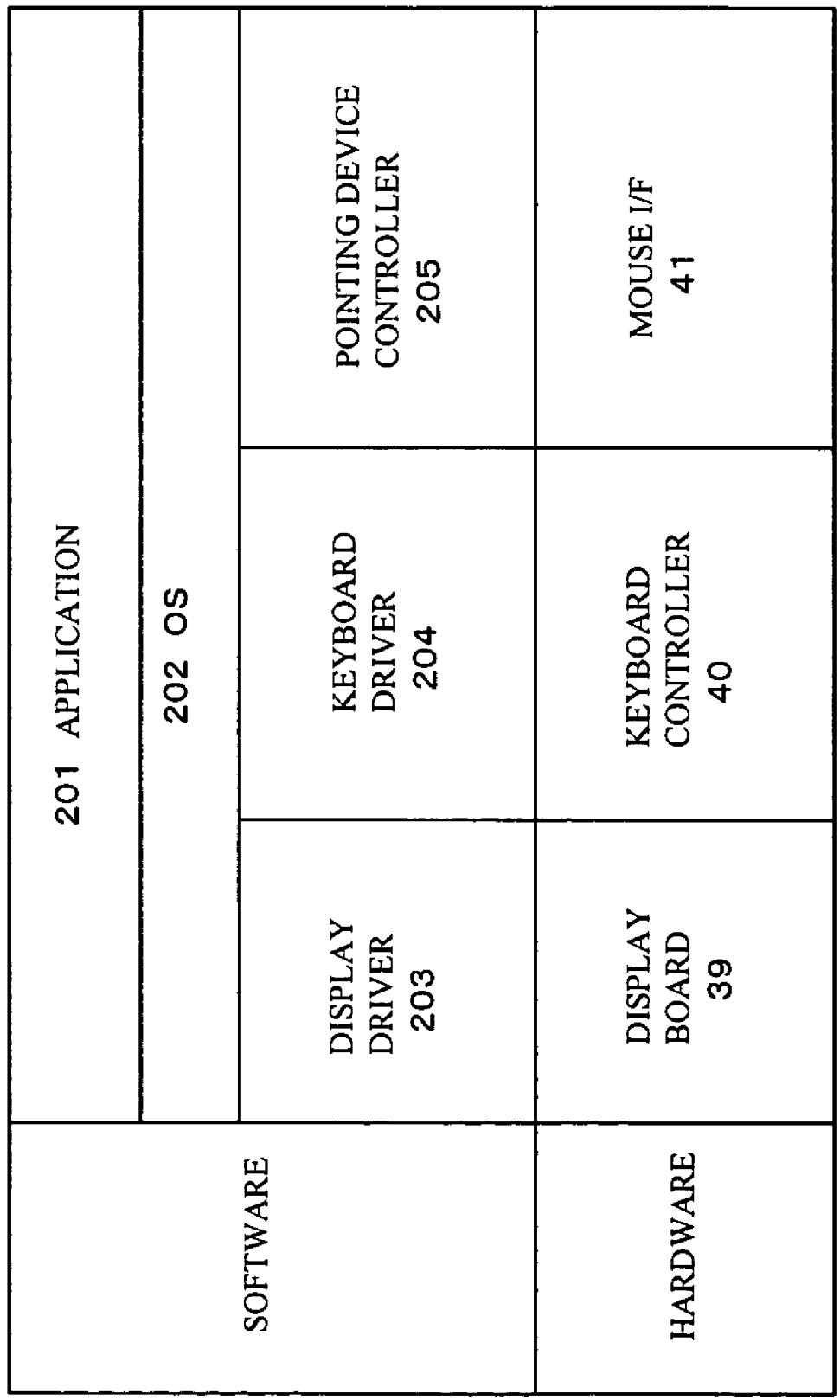
FIG. 4 illustrates the hierarchical structure of the software and hardware of the remote-control computer.

FIG. 4 illustrates the hierarchical structure of the software and hardware of the remote-control computer 32. In FIG. 4, reference numeral 201 indicates application, reference numeral 202 indicates the OS (Operating System), reference numeral 203 indicates a display driver, reference numeral 204 indicates a keyboard driver, and reference numeral 205 indicates a pointing device driver, which form the software hierarchy.

In this hierarchical structure, the application 201 sends a notification to the OS 202 through an API (Application Programming Interface) provided in the OS 202. The OS 202 then sends a notification to the display driver 203 through a GDI (Graphics Device Interface) provided in the OS 202. In turn, the display driver 203 directly controls the display board 39, following the above described course.

Through the above procedures, display contents that are requested by the application 201 are displayed on the display device 46. Also, an input from the keyboard 47 passes through the cable 44, and reaches the keyboard driver 204 under the control of the keyboard controller 40. The key board driver 204 stores the contents of the input in the OS 202. The stored contents are then read out in accordance with a key input request API issued from the application 201, and are transferred to the application 201.

An input from the pointing device 48 (a mouse) passes through the cable 45 and reaches the pointing device driver 205 under the control of the mouse interface 41. The pointing device driver 205 converts the contents of the input into information such as cursor coordinates and button pressing, and then sends the information to the OS 202. The OS 202 relays the information to the application 201. The application 201 judges the condition of the pointing device 48 from the contents of the information sent from the OS 202, and performs a suitable operation.

A predetermined remote-control application program calculates absolute coordinates from relative coordinates of the mouse acquired from the OS 202, based on the resolution of a target computer acquired in advance from the switch 10. The remote-control application then transmits the mouse data, converted into the absolute coordinates, to the switch 10.

Figure 5:
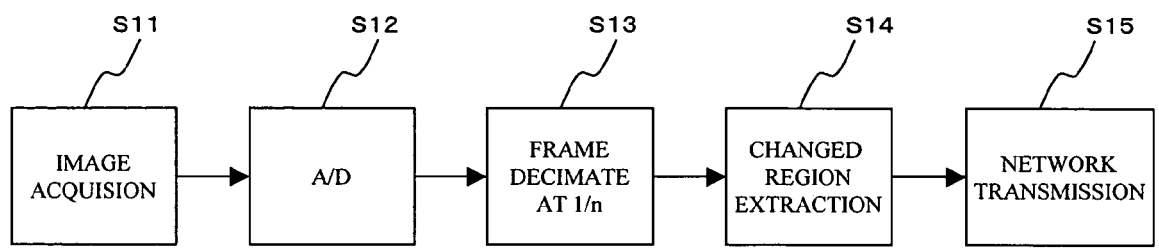
FIG. 5 shows an operation flow of the image processing unit of the switch shown in FIG. 1.

The image processing unit of the switch 10 will be next described. FIG. 5 shows an operation flow of the image processing unit 11. In image acquiring step S11, the image processing unit 11 acquires image data inputted from a selected one of the servers S1 through Sn at 1/n of a scanning frequency F. Here, n is equal to or greater than 1, and is smaller than the scanning frequency F ($1 \leq n < F$).

In A/D conversion step S12, the A/D converting circuit 111 converts analog general image data of each scanning line into digital general image data. At this point, the analog general image data have been obtained from the servers S1 through Sn. In frame decimating step S13, the controller 110 performs frame decimating. Since the images inputted from the servers S1 through Sn are in the neighborhood of 60 Hz and the changed region extraction performed in changed region extracting step (later described) may not end within 1/60 second, it is necessary to perform the frame decimating. The image data that have been subjected to the frame decimating is stored in the memory 112.

In the changed region extracting step S14, the controller 110 detects an image change from a difference between a first image obtained from the servers S1 through Sn and a second image obtained after the first image. If there is an image change, the controller 110 extracts a predetermined region including the changed part of the second image with respect to the first image.

In network transmission step S15, the controller 110 transmits the predetermined region including the changed part of the second image with respect to the first image to the remote-control computer 32 through the network converting circuit 13. If necessary, the image outputted from the controller 110 is compressed by the image compressing circuit 113.

Figure 6:
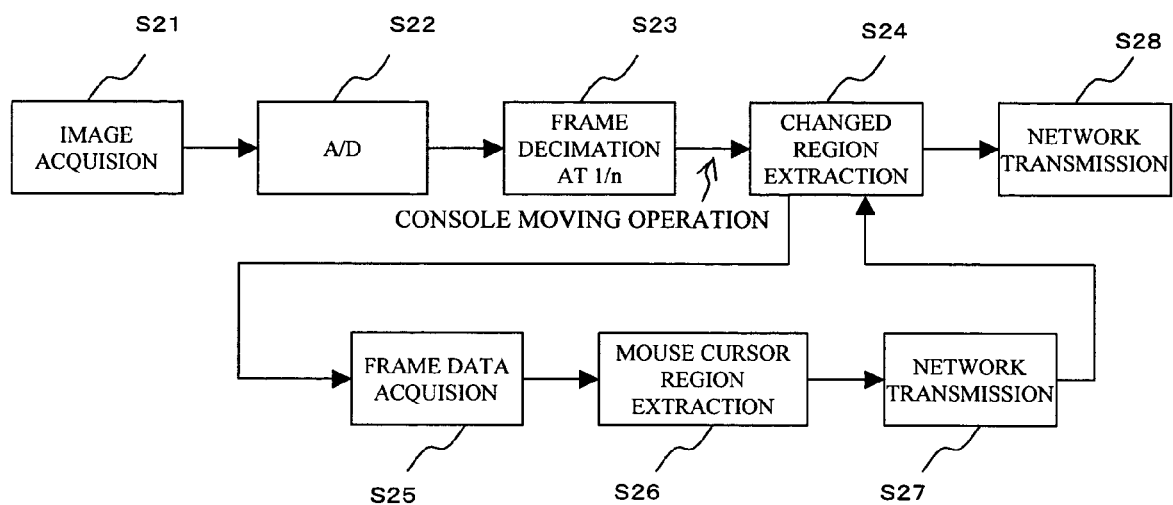
FIG. 6 shows an operation flow of the image processing unit transmitting a mouse cursor peripheral image, using an input of mouse coordinates as a trigger.

Another operation to be performed by the image processing unit 11 will be next described. FIG. 6 shows an operation flow of the image processing unit 11 transmitting a mouse cursor peripheral image, using an input of mouse coordinates as a trigger. In image acquiring step S21, the image processing unit 11 acquires image data from a selected one of the servers S1 through Sn at 1/n of the scanning frequency F.

In A/D conversion step S22, the A/D converting circuit 111 converts the acquired analog general image data into digital data. The A/D converting circuit 111 may temporarily stop the A/D conversion of the general image data, with an input of mouse coordinates from the remote-control computer 32 being a trigger. After a mouse cursor peripheral image that is calculated from the absolute coordinates of the mouse is extracted, the A/D converting circuit 111 may resume the A/D conversion of the general image. In frame decimating step S23, 1/n frame decimating is performed on the image converted into digital data.

In changed region extracting step S24, the controller 110 detects an image change from a difference between a first image obtained from the servers S1 through Sn and a second image obtained after the first image. If there is an image change, the controller 110 extracts a predetermined region including the changed part of the second image with respect to the first image. In network transmission step S28, the controller 110 transmits the extracted region to the remote-control computer 32.

When acquiring the absolute coordinates of the mouse from the remote-control computer 32 in the changed region extracting step S24, the controller 110 moves on to frame data acquiring step S25. In the frame data acquiring step S25, the controller 110 acquires the latest frame data from the memory 112.

In mouse cursor region extracting step S26, the controller 110 extracts a mouse cursor peripheral image. More specifically, based on the absolute coordinates of the mouse acquired from the remote-control computer 32, the controller 110 calculates the mouse cursor location in the image outputted from the servers S1 through Sn. Based on the calculated mouse cursor location, the controller 110 extracts the image data of the corresponding block and the neighborhood block from the image stored in the memory 112. By doing so, the mouse cursor peripheral image is extracted.

At this point, the controller 110 keeps the previously calculated mouse cursor location in the memory 112, and extracts the image data of the block corresponding to the previously calculated mouse cursor location and the image data of the neighborhood block. By doing, the mouse cursor is erased from the original mouse cursor location when the mouse cursor is displayed at the current location.

When extracting the image data of the corresponding block and the neighborhood block from the image stored in the memory 112 based on the calculated mouse cursor location in the mouse cursor region extracting step S26, the controller 110 may detect an image change from a difference between a first image obtained from the servers S1 and Sn and stored in the memory 112 and a second image obtained after the first image, and then extract a predetermined region including the changed part of the second image with respect to the first image.

Figure 7C:
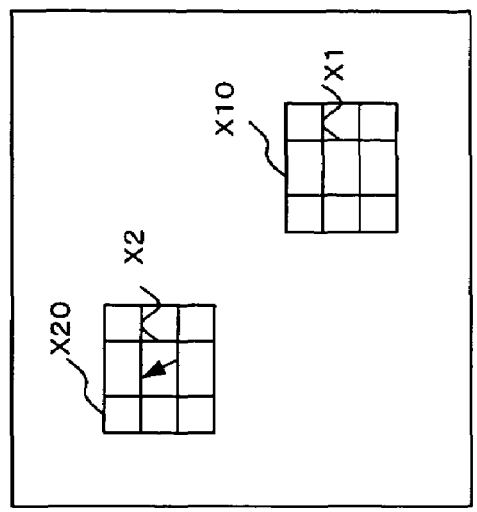
FIGS. 7A through 7C illustrate corresponding blocks and neighborhood blocks to be extracted by the controller.
Figure 7B:
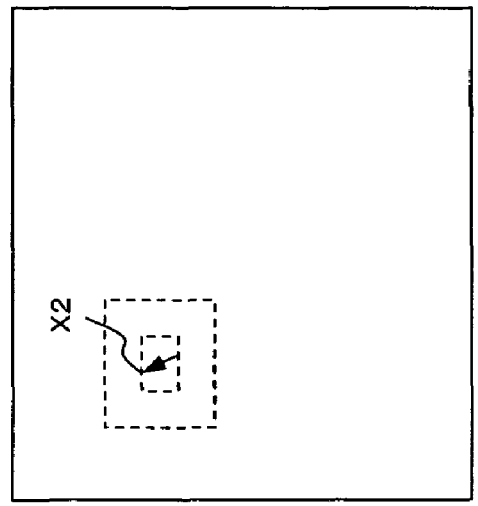
Figure 7A:
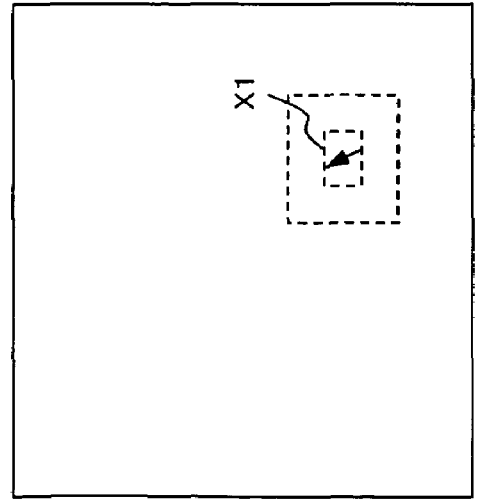

FIGS. 7A through 7C illustrate a corresponding block and a neighborhood block to be extracted by the controller 110. As shown in FIG. 7A, the mouse cursor is first located at X1 on the display device. The mouse cursor then moves to X2 on the display device, as shown in FIG. 7B.

Based on calculated mouse cursor location, the controller 110 extracts the image data of the corresponding block X2 and the image data of the neighborhood block X20 excluding the corresponding block X2, from the current image stored in the memory 112, as shown in FIG. 7C. Based on the previously calculated mouse cursor location, the controller 110 also extracts the image data of the corresponding block X1 and the image data of the neighborhood block X10 excluding the corresponding block X1, from the current image stored in the memory 112. The image of a corresponding block and the image of a neighborhood block form a mouse cursor peripheral image. Although the controller 110 extracts both the corresponding blocks and the neighborhood blocks in this embodiment, it is possible to extract only the corresponding blocks.

In network transmission step S27, the controller 110 adds location information to the extracted mouse cursor peripheral image, and transmits the image to the remote-control computer 32.

Returning to the changed region extracting step S24, the controller 110 detects an image change from the difference between a first image obtained from the servers S1 through Sn and a second image obtained after the first image. If there is an image change, the controller 110 extracts a predetermined region including the changed part of the second image with respect to the first image. In the network transmission step S28, the controller 110 transmits the extracted region to the remote-control computer 32.

As described above, the controller 110 extracts the previous and current mouse cursor peripheral images in the mouse cursor region extracting step S26, and transmits the images to the remote-control computer 32. Based on the received mouse cursor peripheral images and the location information, the remote-control computer 32 performs a display operation on the display device, so that the mouse cursor disappears from the previous location and appears at the current location.

In this manner, the mouse cursor peripheral images are transmitted first, and the rest of the image is then gradually detected and transmitted. Accordingly, the mouse cursor moves first on the display device of the remote-control computer 32.

Figure 8:
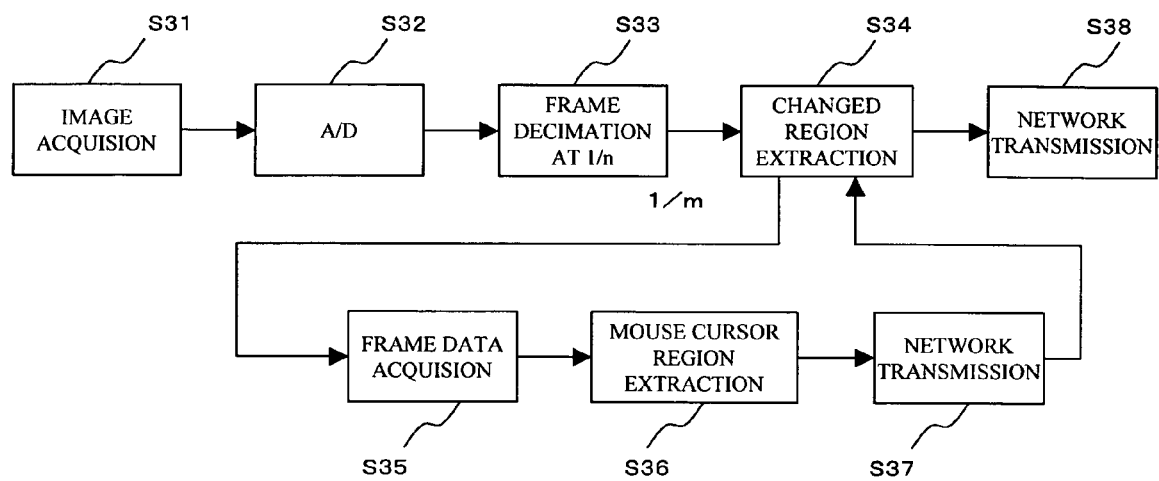
FIG. 8 shows an operation flow of a mouse cursor region extracting operation to be performed by the image processing unit at predetermined intervals.

Yet another operation to be performed by the image processing unit 11 will now be described. FIG. 8 shows an operation flow of a mouse cursor region extracting operation to be performed by the image processing unit 11 at predetermined intervals. In image acquiring step S31, the image processing unit 11 acquires image data from a selected one of the servers S1 through Sn at 1/n of the scanning frequency F. In A/D conversion step S32, the A/D converting circuit 111 converts the acquired analog general image data to digital image data.

In frame decimating step S33, 1/n frame decimating is performed on the digital image data. In changed region extracting step S34, the controller 110 detects an image change from the difference between a first image obtained from the servers S through Sn and a second image obtained after the first image. If there is an image change, the controller 110 extracts a predetermined region including the changed part of the second image with respect to the first image.

In network transmission step S38, the controller 110 transmits the extracted region to the remote-control computer 32. In the changed region extracting step S34, the controller 110 moves on to frame data acquiring step S35, so as to extract a mouse cursor peripheral image at predetermined intervals. Here, each predetermined interval is 1/m.

Figure 13:
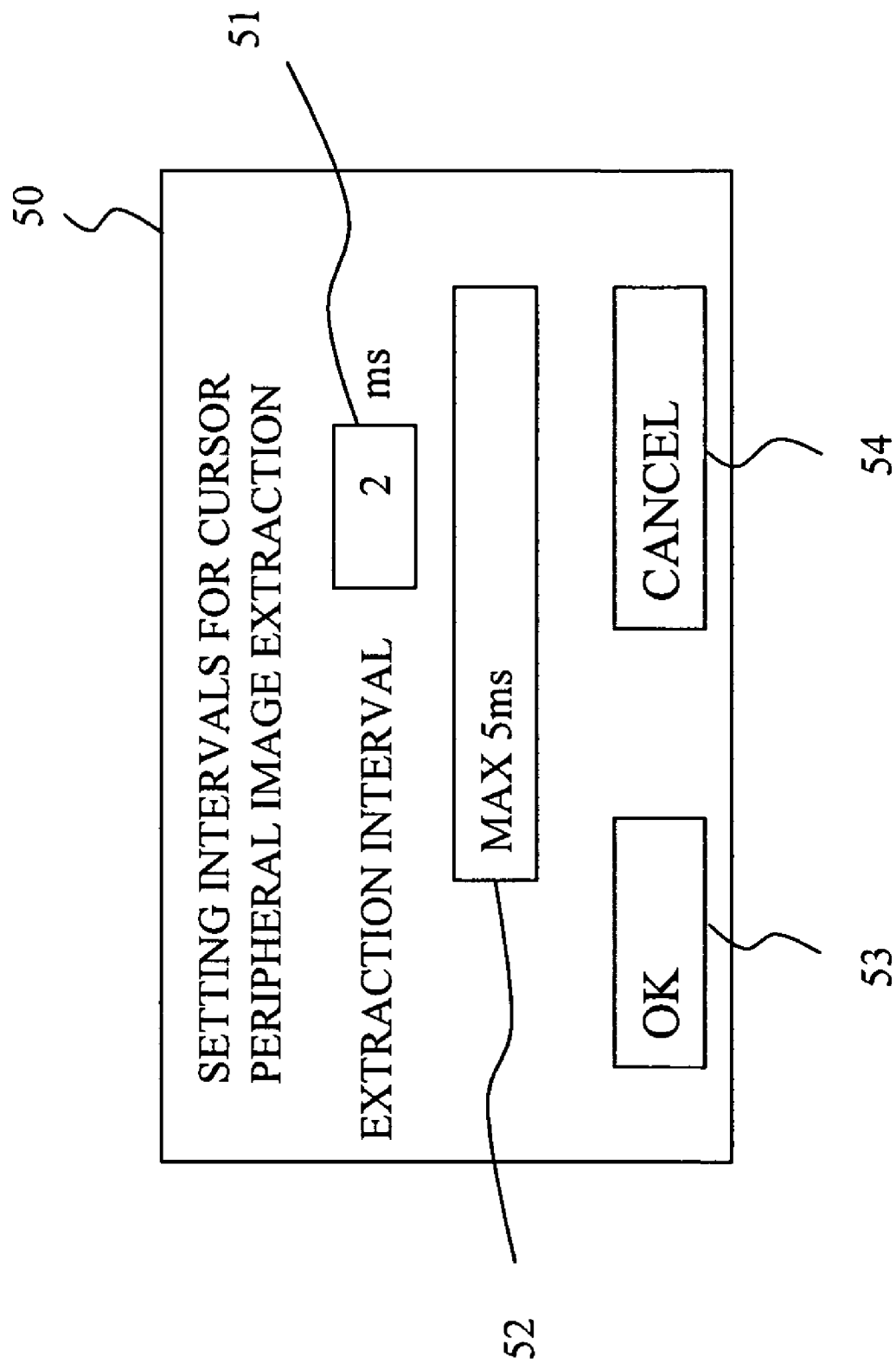
FIG. 13 shows a display example of a dialog for setting intervals at which a cursor peripheral image is extracted.

The intervals at which the remote-control computer 32 extracts mouse coordinate values are generally, 5 ms, 8 ms, and 10 ms. Therefore, m should be adjusted to the longest intervals at which the mouse coordinates are extracted. In this manner, high pointing accuracy can be maintained, while the data processing amount and the data transmission amount can be reduced. The display device 46 connected to the remote-control computer 32 may display such a dialog as to set intervals at which a cursor peripheral image is extracted, as shown in FIG. 13. Using the dialog, users can change the preset value.

FIG. 13 shows an example of the dialog display for setting intervals at which a cursor peripheral image is extracted. In FIG. 13, reference numeral 50 indicates an interval setting screen for extracting cursor peripheral images, reference numeral 51 indicates an interval input field for extracting cursor peripheral images, reference numeral 52 indicates an area that shows the largest possible value of the intervals at which a cursor peripheral image can be extracted, reference numeral 53 indicates an OK button, and reference numeral 54 indicates a cancel button. The cursor peripheral image extraction intervals set by a user are then transmitted from the remote-control computer 32 to the controller 110 of the switch 10.

In the frame data acquiring step S35, the controller 110 acquires the latest frame data from the memory 112. In mouse cursor region extracting step S36, the controller 110 extracts a mouse cursor peripheral image. More specifically, based on the absolute coordinates of the mouse acquired from the remote-control computer 32, the controller 110 calculates the mouse cursor location in the image outputted from the servers S1 through Sn. Based on the calculated mouse cursor location, the controller 110 extracts the image data of the corresponding block and the neighborhood block from the image stored in the memory 112. By doing so, the mouse cursor peripheral image is extracted.

The controller 110 keeps the previously calculated mouse cursor location in the memory 112, and also extracts the image data of the block corresponding to the previously calculated mouse cursor location and the image data of the neighborhood block. In network transmission step S37, the controller 110 adds location information to the extracted mouse cursor peripheral image, and transmits the image to the remote-control computer 32.

Returning to the changed region extracting step S34, the controller 110 detects an image change from the difference between a first image obtained from the servers S1 through Sn and a second image obtained after the first image. If there is an image change, the controller 110 extracts a predetermined region including the changed part of the second image with respect to the first image. In network transmission step S38, the controller 10 transmits the extracted region to the remote-control computer 32.

As described above, the controller 110 extracts a mouse cursor region at predetermined intervals, and transmits the previous and current mouse cursor peripheral images to the remote-control computer 32. Accordingly, even if the coordinate information of the mouse cannot be obtained over a certain period of time, mouse cursor peripheral images can be transmitted to the remote-control computer 32.

Figure 9:
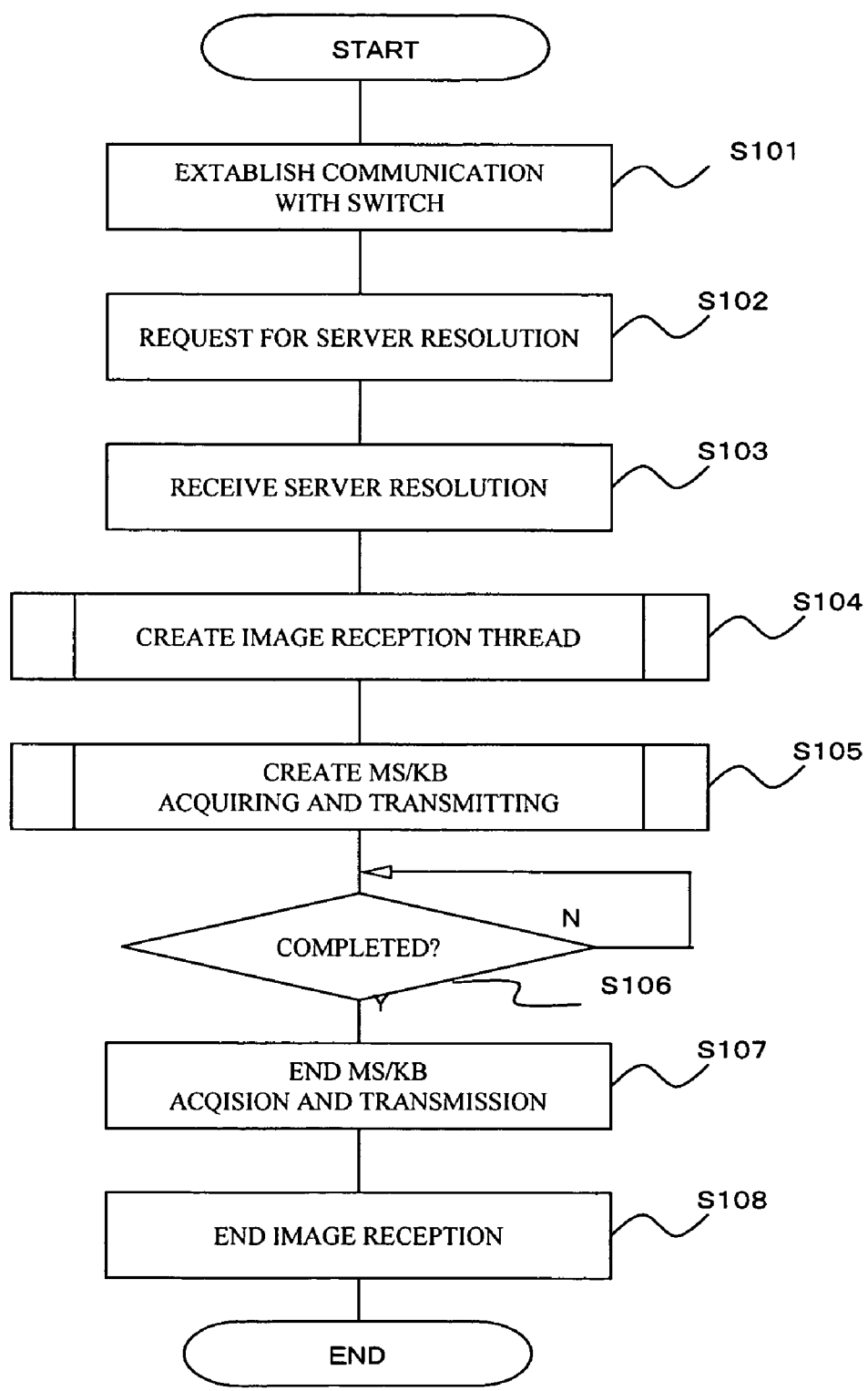
FIG. 9 is a flowchart of an operation to be performed by a remote-control computer.

An operation of the remote-control computer 32 will be next described. FIG. 9 shows a flowchart of an operation to be performed by the remote-control computer 32. In step S101, the remote-control computer 32 establishes a communication with the switch 10 when the application is activated. In step S102, the remote-control computer 32 requests the switch 10 to send the resolution of the image that is displayed at the server end.

In step S103, the remote-control computer 32 receives the resolution of the image displayed on the servers S1 through Sn from the switch 10. Receiving the resolution of the servers S1 through Sn from the switch 10, the remote-control computer 32 creates an image reception thread. In step S105, the remote-control computer 32 creates a mouse(MS)/keyboard (KB) acquisition and transmission thread. By doing so, the remote-control computer 32 enters an operation loop, and, when the mouse or the keyboard is operated, the remote-control computer 32 transmits predetermined data to the switch 10.

In step S106, the remote-control computer 32 determines whether a remote-control operation is completed by a user or terminated by a manager. If the remote-control computer 32 determines that the remote-control operation is ended in step S106, the MS/KB acquisition and transmission are ended in step S107. In step S108, the remote-control computer 32 ends the image reception from the switch 10.

Figure 10:
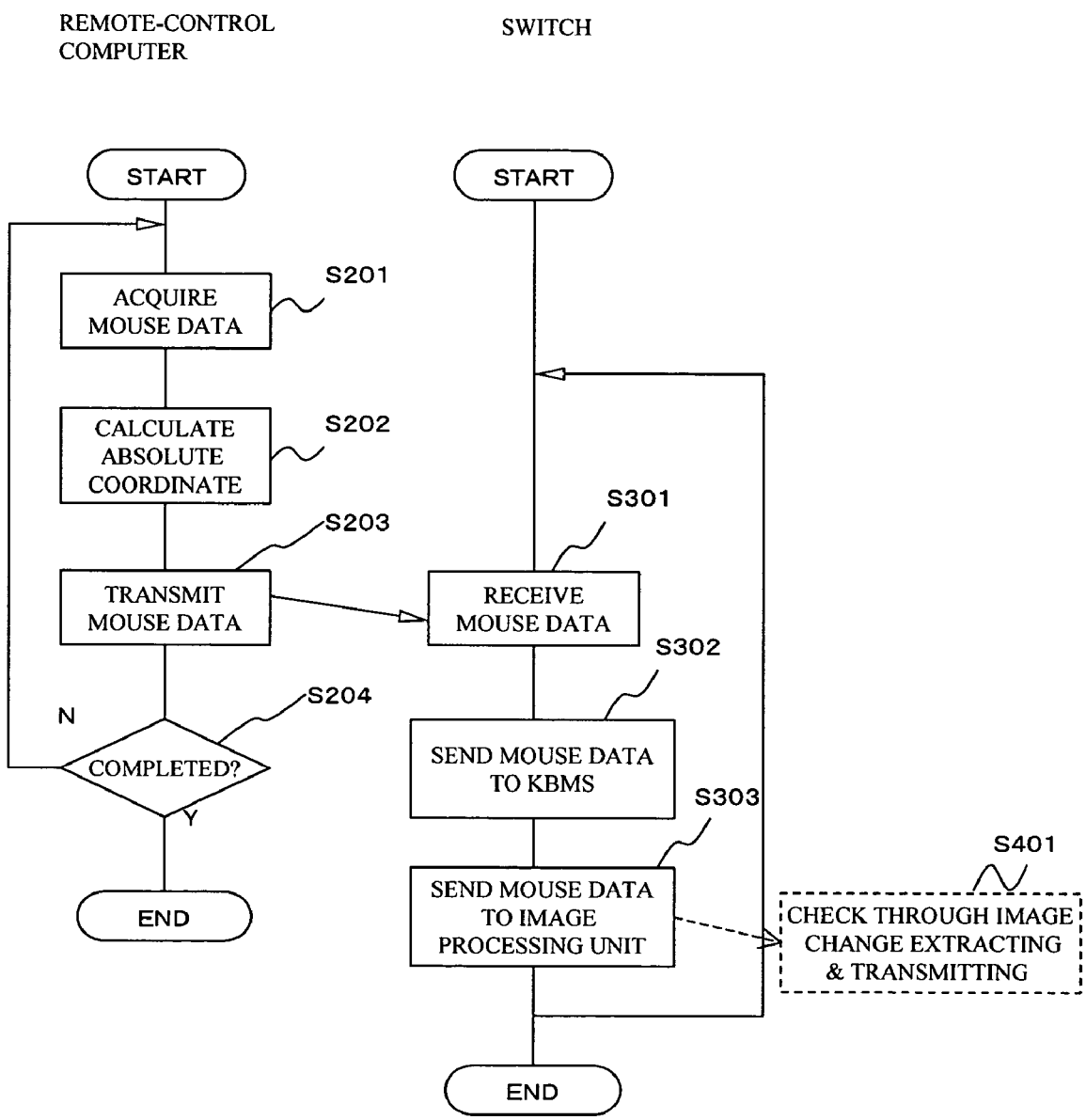
FIG. 10 illustrates a mouse data acquiring and transmitting operation to be performed in the remote-control computer and a mouse data receiving operation to be performed in the switch.

A mouse data acquiring and transmitting operation of the remote-control computer 32 and a mouse data receiving operation of the switch 10 will now be described. FIG. 10 illustrates the mouse data acquiring and transmitting operation of the remote-control computer 32 and the mouse data receiving operation of the switch 10.

A remote-control application program that runs in the remote-control computer 32 displays the screen of a target computer selected by the switch 10. So as to start a remote-control operation, the remove-control computer 32 acquires mouse data that are generated by operating a mouse in step S201.

In step S202, the remote-control computer 32 calculates absolute coordinates from the relative coordinates of the acquired mouse data. More specifically, based on the mouse cursor location on the window of the remote-control application and the resolution of the target computer acquired from the switch 10 in advance, the absolute coordinates are calculated from the relative coordinates of the acquired mouse data. When the mouse is operated, the remote-control computer 32 calculates the absolute coordinates according to the operation of the mouse.

In step S203, the remote-control computer 32 transmits the mouse data, which have been converted into the absolute coordinates, to the switch 10. In step S204, the remote-control computer 32 determines whether the mouse data acquiring and transmitting operation has been completed. If the mouse data acquiring and transmitting operation has not been completed, the remote-control computer 32 returns to step S201 and repeats the operation loop. If the mouse data acquiring and transmitting operation has been completed, the remote-control computer 32 ends the operation.

In step S301, the network converting circuit 13 of the switch 10 receives the absolute coordinate data of the mouse from the remote-control computer 32. In step S302, the controller 15 transmits the absolute coordinate data of the mouse to the KBMS controlling microcomputer 16.

In step S303, the controller 15 transmits the absolute coordinate data of the mouse to the image processing unit 11. In steps S302 and S303, the controller 15 transmits the absolute coordinate data of the mouse to the KBMS controlling microcomputer 16 and the image processing unit 11. However, the KBMS controlling microcomputer 16 and the image processing unit 11 may access the controller 15 to refer to the absolute coordinate data of the mouse. In step S401, the image processing unit 11 performs a checking operation through an image change extracting and transmitting operation.

Figure 11:
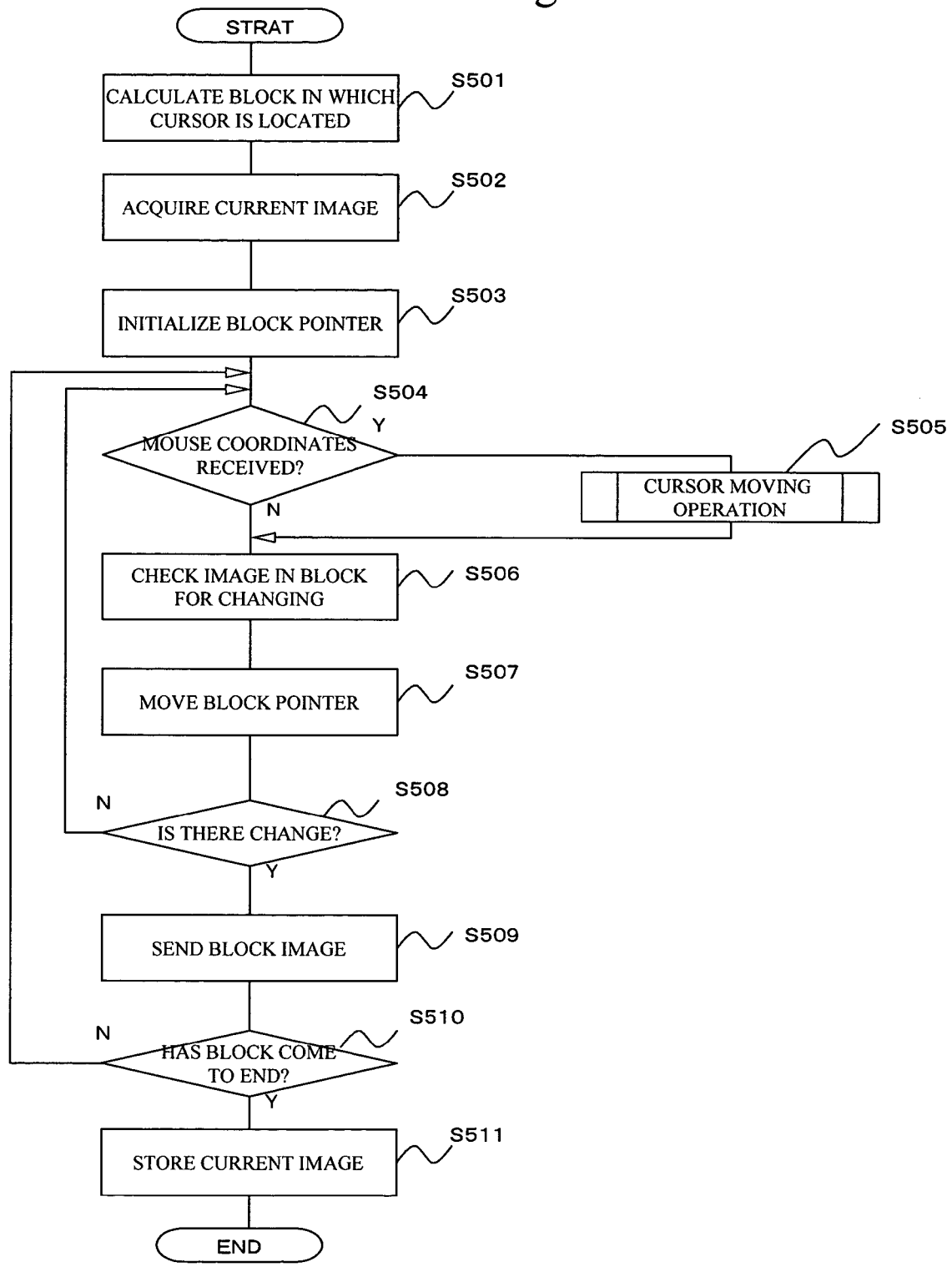
FIG. 11 is a flowchart of an image change extracting and transmitting operation.

The image change extracting and transmitting operation of the image processing unit 11 will be next described. FIG. 11 is a flowchart of the image change extracting and transmitting operation. In step S501, the controller 110 calculates the block in which the mouse cursor exists, using the absolute coordinate values of the mouse of the remote-control computer 32 that are acquired from the controller 15. In other words, the controller 110 calculates the location of the image in the memory 112.

In step S502, the controller 110 obtains the current image from the memory 112. In step S503, the controller 110 creates a pointer with respect to an address in the memory 112, and adjusts the pointer to the image in blocks, thereby initializing the block pointer.

In step S504, the controller 110 determines whether the absolute coordinate values of the mouse have been received from the remote-control computer 32. If the absolute coordinate values of the mouse have not been received from the remote-control computer 32 in step S504, the controller 110 moves on to step S506.

If the absolute coordinate values of the mouse have been received from the remote-control computer 32 in step S504, the controller 110 performs a cursor moving operation in step S505. The cursor moving operation will be described later in detail.

In step S506, the controller 110 checks the image for a change in a block. In step S507, the controller 110 moves the block pointer. In step S508, the controller 110 determines whether there is a change in the image in the block. If there is not a change in the image in the block in step S508, the controller 110 returns to step S504.

If there is a change in the image in the block in step S508, the controller 110 moves on to step S509 to transmit the image of the corresponding block to the remote-control computer 32.

In step S510, the controller 110 moves the block pointer, and determines whether the block comes to an end. The block pointer is moved, starting from the top left in the image and ending at the bottom right in the image, for example. When the block pointer reaches the bottom right, the controller 110 determines that the block comes to an end. If the block has not come to an end in step S510, the controller 110 returns to step S504.

If the block has come to an end in step S510, the controller 110 moves on to step S511. In step S511, the controller 110 stores the current image data in the memory 112, and ends the image change extracting and transmitting operation.

Figure 12:
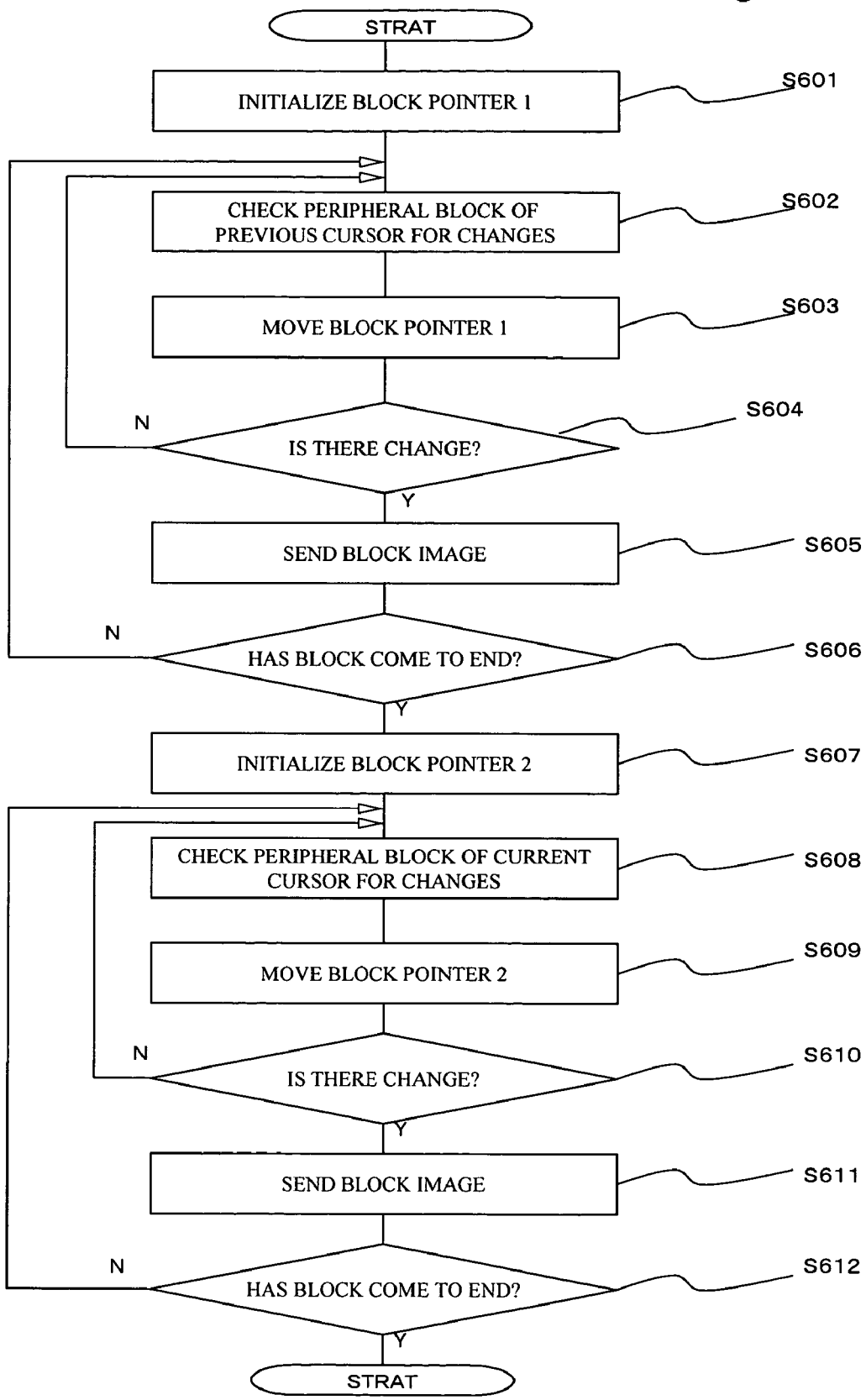
FIG. 12 is a flowchart of a cursor moving operation.

The cursor moving operation will now be described. FIG. 12 illustrates the cursor moving operation of step S505 shown in FIG. 11. In steps S601 through S606, the controller 110 checks the peripheral block that surrounds the previous mouse cursor. In steps S607 through S612, the controller 110 checks the peripheral block that surrounds the current mouse cursor.

In step S601, the controller 110 initializes a block pointer 1. In step S602, the controller 110 checks the peripheral block of the previous cursor for changes. In step S603, the controller 110 moves the block pointer 1.

In step S604, the controller 110 determines whether there is a change in the peripheral block of the previous cursor. If there is not a change in the peripheral block of the previous cursor in step S604, the controller 110 returns to step S602. If there is a change in the peripheral block of the previous cursor in step S604, the controller 110 moves on to step S605 to transmit the image of the peripheral block to the remote-control computer 32.

In this manner, the controller 110 of the image processing unit 11 extracts the images of the corresponding block and the peripheral block from the previous image obtained from the memory 112. The controller 110 of the image processing unit 11 adds location information to the region that includes the changed parts, only when there is a change in the extracted image of the peripheral block of the previous cursor. The controller 110 then transmits the extracted image with the location information to the remote-control computer 32 through the network converting circuit 13.

In step S606, the controller 110 determines whether the checking of the block has been completed. If the checking of the block has not been completed in step S606, the controller 110 returns to step S602. If the checking of the block has been completed in step S606, the controller 110 moves on to step S607 to initialize a block pointer 2.

In step S608, the controller 110 checks the peripheral block of the current cursor for changes. In step S609, the controller 110 moves the block pointer 2. In step 610, the controller 110 determines whether there is a change in the peripheral block of the current cursor. If there is not a change in the peripheral block of the current cursor, the controller 110 returns to step S608.

If there is a change in the peripheral block surrounding the current cursor in step S610, the controller 110 moves on to step S611 to output the extracted image of the block to the remote-control computer 32.

In this manner, the controller 110 of the image processing unit 11 extracts the images of the corresponding block and the peripheral block of the cursor from the current image obtained from the memory 112. The controller 110 of the image processing unit 11 adds location information to the region including the changed part, only when there is a change in the extracted image of the peripheral block of the current cursor. The controller 110 then transmits the extracted image with the location information to the remote-control computer 32 via the network converting circuit 13. The controller 110 of the image processing unit 11 transmits the image of the peripheral block of the previous mouse cursor and the image of the peripheral block of the current mouse cursor at the same time.

In step S612, the controller 110 determines whether the checking of the block has been completed. If the checking has not been completed, the controller 110 returns to step S608. If the checking has been completed, the controller 110 ends the cursor moving operation.

In the remote-control computer 32, the network controlling unit 42 receives the image of the peripheral block of the previous mouse cursor and the image of the peripheral block of the current mouse cursor including of the changed part. The received image of the peripheral block of the previous mouse cursor and the image of the peripheral block of the current mouse cursor are written onto the graphic memory 39b through the system bus 36, in accordance with a command issued by the CPU 33.

In accordance with a control command issued by the CPU 33, the display controller 39a refers to the contents of the graphic memory 39b, and combines the image currently displayed on the display device 46 with the image of the peripheral block of the previous mouse cursor and the image of the peripheral block of the current mouse cursor, thereby converting the contents into interface signals that can be displayed on the display device 46. The interface signals are transferred to the display device 46 through the cable 43, and are then displayed on the display device 46. As a result, the mouse cursor disappears from the position in which the mouse cursor was located prior to the change, and the mouse cursor is movably displayed in the current position after the change.

Figure 14:
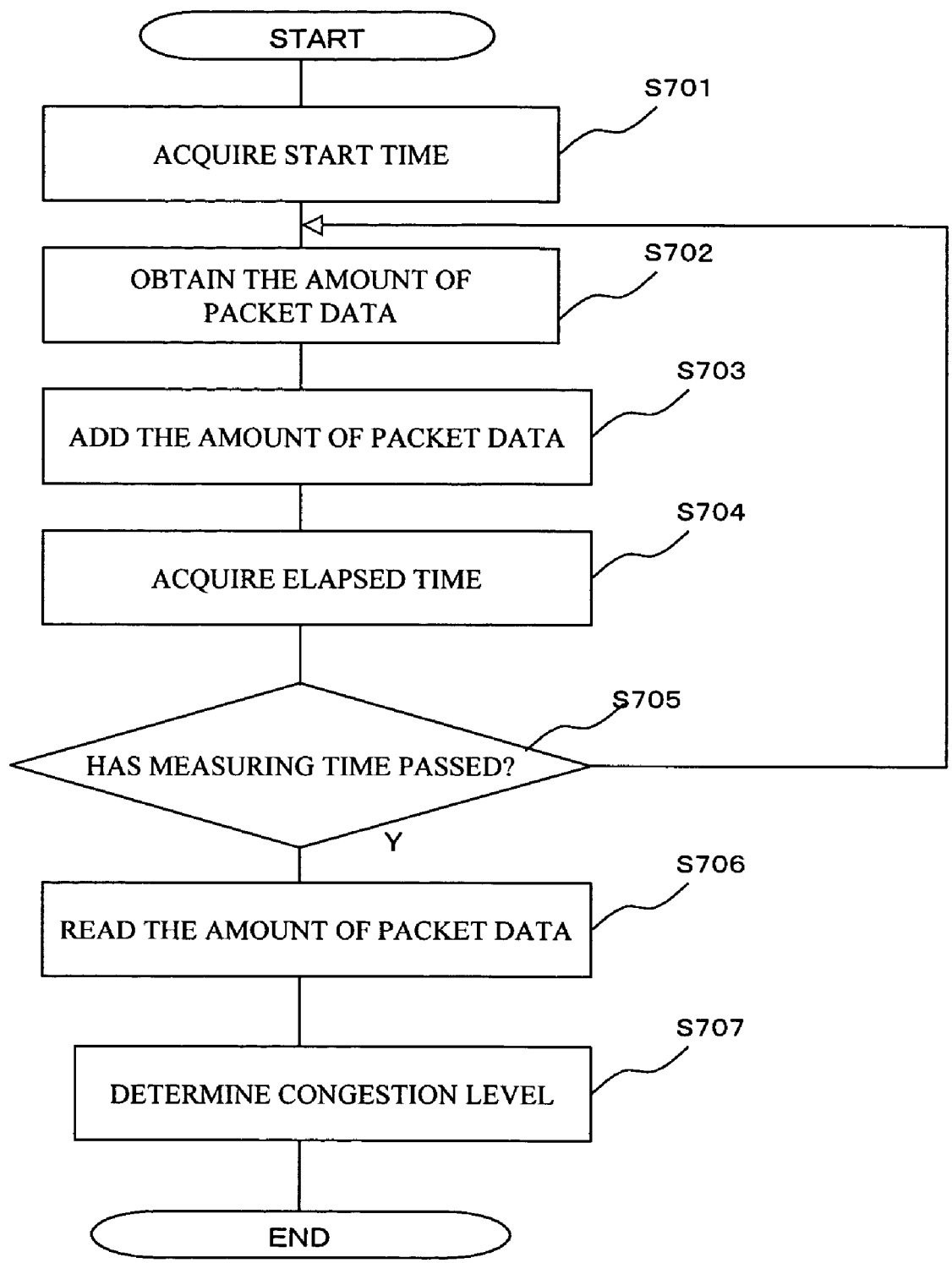
FIG. 14 is a flowchart of a packet filtering operation to be performed by the switch.

The network congestion calculating operation to be performed by the switch 10 will now be described. FIG. 14 is a flowchart of a packet filtering operation of the switch 10. The switch 10 is equipped with a packet filtering function so as to calculate the amount of packet data in a measuring time and determine the congestion level of the network 30. The network converting circuit 13 operates in promiscuous mode, and transfers all received packets to the packet filtering circuit 14.

In step S701, the controller 15 acquires the start time at which the amount of packet data is received. The start time is used for controlling the operation timing of the packet filtering function. In step S702, the controller 15 obtains the amount of packet data from the packet filtering circuit 14. In step S703, the packet filtering circuit 14 adds the amount of packet data.

In step S704, the controller 15 acquires the elapsed time. In step S705, the controller 15 determines whether the measuring time has passed. If the measuring time has passed, the controller 15 moves on to step S706 to read out the amount of packet data from the packet filtering circuit 14. In step S707, the controller 15 calculates the data flow rate (BPS: Bit Per Second) to determine the congestion level of the network. If the measuring time has not passed in step S705, the controller 15 returns to step S702.

The controller 15 may determine the image compression technique and the compression ratio for the image compressing circuit 113 in accordance with the calculated congestion level of the network. The controller 15 may also automatically change the image compression technique and the compression ratio for the image compressing circuit 113. The controller 15 outputs the calculated congestion level of the network to the controller 110 of the image processing unit 11. Based on the congestion level of the network, the controller 110 may change the intervals at which a cursor peripheral image is extracted.

Although the switch 10 shown in FIG. 1 has been described as an embodiment, the present invention is not limited to it and may be embodied by an image transmission apparatus. Such an image transmission apparatus requires: an information acquiring unit that acquires cursor location information from an information processing apparatus; an image extracting unit that extracts a cursor peripheral image from an image storing unit based on the cursor location information acquired by the information acquiring unit, the image storing unit storing an image to be transmitted to the information processing apparatus; and a cursor image transmitting unit that transmits the cursor peripheral image, extracted by the image extracting unit, to the information processing apparatus.

In the above embodiment, a cursor peripheral image is extracted from the image storing unit based on the cursor location information acquired from a remote-control computer, and the extracted cursor peripheral image is transmitted to the remote-control computer. In this manner, the cursor frame rate can be increased. Thus, high pointing accuracy can be maintained.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image transmission apparatus that transmits a stream of images to an information processing apparatus connected to a predetermined network, the image transmission apparatus comprising:
   an information acquiring unit that acquires cursor location information from the information processing apparatus;
   an image extracting unit that extracts cursor peripheral images from an image storing unit that stores the images to be transmitted to the information processing apparatus, based on the cursor location information acquired by the information acquiring unit;
   a cursor image transmitting unit that transmits the cursor peripheral images, extracted by the image extracting unit, to the information processing; and
   an image transmitting unit that transmits a general image to the information processing apparatus,
   wherein, when the cursor location information is acquired from the information processing apparatus, the image transmitting unit stops transmitting the general image to the information processing apparatus, and, after the cursor peripheral image is transmitted by the cursor image transmitting unit, the image transmitting unit resumes transmitting the general image to the information processing apparatus, the cursor peripheral images including an image of a cursor on a screen formed by the stream of images transmitted and images located in a periphery of the cursor.

2. The image transmission apparatus as claimed in claim 1, wherein the image extracting unit detects an image change from a difference between a first image to be transmitted to the information processing apparatus and a second image to be transmitted after the first image, and extracts a predetermined region that includes the changed portion of the second image with respect to the first image.

3. A method of transmitting a stream of images to an information processing apparatus connected to a predetermined network, comprising:
   acquiring cursor location information from the information processing apparatus;
   extracting cursor peripheral images from an image storing unit that stores the images to be transmitted to the information processing apparatus, based on the cursor location information acquired in the acquiring of the cursor location information;
   transmitting the cursor peripheral images, extracted in the extracting of the cursor peripheral image, to the information processing apparatus; and
   transmitting a general image to the information processing apparatus, wherein the transmitting of the general image includes stopping transmitting the general image to the information processing apparatus when the cursor location information is acquired from the information processing apparatus, and resuming transmitting the general image to the information processing apparatus after the cursor peripheral image is transmitted, the cursor peripheral images including an image of a cursor on a screen formed by the stream of images transmitted and images located in a periphery of the cursor.

4. The method as claimed in claim 3, wherein the extracting of the cursor peripheral image includes detecting an image change from a difference between a first image to be transmitted to the information processing apparatus and a second image to be transmitted after the first image, and extracting a predetermined region that includes the changed portion of the second image with respect to the first image.

5. The method as claimed in claim 3, further comprising the step of performing image processing on a general image to be transmitted to the information processing apparatus,
   wherein the image processing includes stopping performing the image processing on the general image when the cursor location information is acquired from the information processing apparatus, and resuming the image processing on the general image after the cursor peripheral image is transmitted.

6. The method as claimed in claim 3, wherein the image transmitting includes detecting an image change from a difference between a first image obtained from a computer and a second image acquired after the first image, and transmitting a predetermined region that includes the image change of the second image with respect to the first image, to the information processing apparatus.

7. The method as claimed in claim 3, wherein the image extracting includes extracting the cursor peripheral image at predetermined intervals.

8. The method as claimed in claim 7, wherein the predetermined intervals are changed in accordance with a preset value transmitted from the information processing apparatus.

9. The method as claimed in claim 7, wherein the predetermined intervals are changed in accordance with the congestion level of the network.

10. The method as claimed in claim 3, further comprising compressing an image to be transmitted to the information processing apparatus.

11. The method as claimed in claim 10, wherein the compressing includes changing a compression technique or a compression ratio in accordance with the congestion level of the network.

12. An image transmitting program product for operating a computer that transmits a stream of images to an information processing apparatus connected to a predetermined network, the image transmitting program product causing the computer to function as:
   an information acquiring unit that acquires cursor location information from the information processing apparatus;
   an image extracting unit that extracts cursor peripheral images from an image storing unit that stores the images to be transmitted to the information processing apparatus, based on the cursor location information acquired by the information acquiring unit;

a cursor image transmitting unit that transmits the cursor peripheral images, extracted by the image extracting unit, to the information processing; and an image transmitting unit that transmits a general image to the information processing apparatus, wherein, when the cursor location information is acquired from the information processing apparatus, the image transmitting unit stops transmitting the general image to the information processing apparatus, and, after the cursor peripheral image is transmitted by the cursor image transmitting unit, the image transmitting unit resumes transmitting the general image to the information processing apparatus, the cursor peripheral images including an image of a cursor on a screen formed by the stream of images transmitted and images located in a periphery of the cursor.

13. The image transmitting program product as claimed in claim 12, wherein the image extracting unit detects an image change from a difference between a first image to be transmitted to the information processing apparatus and a second image to be transmitted after the first image, and extracts a predetermined region that includes the changed portion of the second image with respect to the first image.

14. The image transmitting program product as claimed in claim 12, further causing the computer to function as an image processing unit that performs image processing on a general image to be transmitted to the image processing apparatus, wherein, when the cursor location information is acquired from the information processing apparatus, the image processing unit stops performing the image processing on the general image, and, after the cursor peripheral image is transmitted by the cursor image transmitting unit, the image transmitting unit resumes the image processing on the general image.

15. The image transmitting program product as claimed in claim 12, wherein the image transmitting unit detects an image change from a difference between a first image to be transmitted to the information processing apparatus and a second image to be transmitted after the first image, and transmits a predetermined region that includes the changed portion of the second image with respect to the first image, to the information processing apparatus.

16. The image transmitting program product as claimed in claim 12, wherein the image extracting unit extracts the cursor peripheral image at predetermined intervals.

17. The image transmitting program product as claimed in claim 16, wherein the predetermined intervals are changed in accordance with a preset value transmitted from the information processing apparatus.

18. The image transmitting program product as claimed in claim 16, wherein the predetermined intervals are changed in accordance with the congestion level of the network.

19. The image transmitting program product as claimed in claim 12, further causing the computer to function as an image compressing unit that compresses an image to be transmitted to the information processing apparatus.

20. The image transmitting program product as claimed in claim 19, wherein the image compressing unit changes a compression technique or a compression ratio in accordance with the congestion level of the network.

* * * * *

UNITED STATES PATENT AND TRADEMARK OFFICE
CERTIFICATE OF CORRECTION

| | | |
|---|---|---|
| PATENT NO. | : 7,595,770 B2 | Page 1 of 1 |
| APPLICATION NO. | : 10/808392 | |
| DATED | : September 29, 2009 | |
| INVENTOR(S) | : Kenichi Fujita et al. | |

It is certified that error appears in the above-identified patent and that said Letters Patent is hereby corrected as shown below:

Column 15, Line 42, claim 1 change "processing;" to --processing apparatus;--.

Column 17, Line 6, claim 12 change "processing;" to --processing apparatus;--.

Signed and Sealed this

Fifth Day of January, 2010

David J. Kappos
*Director of the United States Patent and Trademark Office*